United States Patent [19]

Krupman et al.

[11] 4,140,522

[45] Feb. 20, 1979

[54] METHOD OF REFINING OF METAL

[76] Inventors: Leonid I. Krupman, ulitsa R. Ljuxemburg, 30a, kv. 17; Alexandr E. Sochnev, ulitsa Naberezhnaya, 147, kv. 2; Boris V. Gavronsky, bulvar Shkolny, 21, kv. 30; Sergei P. Efimenko, bulvar Pushkina, 29, kv. 40; Leonid M. Pokrass, ulitsa Pionerskaya, 98, all of Donetsk; Alexandr P. Voropaev, ulitsa Sotsialisticheskaya, 3, Kommunarsk Voroshilovgradskoi oblasti; Vakhtang V. Mosiashvili, ulitsa Kirova, 23a, kv. 2, Kommunarsk Voroshilovgradskoi oblasti; Valentin Y. Laschev, ulitsa Chapaeva, 53, kv. 15, Kommunarsk Voroshilovgradskoi oblasti; Abram M. Ofengenden, ulitsa Tkachenko, 135, kv. 20, Donetsk, all of U.S.S.R.

[21] Appl. No.: 541,409

[22] Filed: Jan. 16, 1975

[51] Int. Cl.² .................................................. C21C 7/00
[52] U.S. Cl. .......................................... 75/46; 75/61

[58] Field of Search ............... 75/10 R, 13, 24, 28, 75/45, 46, 53, 61

[56] References Cited

U.S. PATENT DOCUMENTS

| 3,258,328 | 6/1966 | Goss | 75/53 |
| 3,406,027 | 10/1968 | Bonilla | 75/53 |
| 3,576,320 | 4/1971 | Faste | 75/61 |

*Primary Examiner*—P. D. Rosenberg
*Attorney, Agent, or Firm*—Haseltine, Lake & Waters

[57] ABSTRACT

A method for refining a quantity of metal by a correlated quantity of fluid slag comprising discharging the metal to be refined as a stream into a refining vessel and discharging the slag into the vessel in a stream which strikes the metal stream. The slag is discharged in an amount equal to 50% of the total slag content before the discharge of 20% of the metal is completed, the discharge of slag being halted while continuing the discharge of the metal until 50% of the metal has been discharged. The discharge of the remaining 50% of the slag content is resumed as a stream striking the metal stream during the time when the remaining 50% of the metal is discharged.

4 Claims, No Drawings

METHOD OF REFINING OF METAL

The present invention relates to metal production and, more specifically, to a method for refining of metal by a fluid slag.

A method has previously been proposed for refining of metal by fluid slag, in which the metal is poured off on the slag which is in a ladle or other chamber. When a stream of the metal hits the slag the metal mixes with the latter, and as a result metal refining occurs.

In this method the refining process mainly occurs in the first half of the discharge of metal when the kinetic energy to the stream is sufficiently great. In the second half of the metal discharge, as the height of the fall of the metal stream diminishes and the pressure of the outflow of the stream decreases, the refining process diminishes sharply or ceases altogether. This is a shortcoming of this method.

In the second half of the discharge, the refinery slag, as a rule, still possesses a sufficiently high refining capacity which, however, is not used because of the small interface of the reacting phases.

Also known in the art is a refining method according to which, for increasing the interface, and, consequently, for raising the efficiency, slag is poured off on a metal stream in the first half of the metal discharge period.

However, as mentioned, in the first half of metal discharge due to the stream's great kinetic energy, the phase interface is large.

An increase in the degree of phase mixing, due to collision of the streams of slag and metal, will raise but little the efficiency of treatment.

The main object of the present invention is to develop a method for refining of metal by fluid slag, which raises the efficiency of metal treatment.

The above and other objects of the invention are achieved in a method for refining of metal by a fluid slag, in which the slag is discharged on a stream of metal, and according to the invention, one half of a given amount of slag is poured off before the discharge of the first 20% of metal is completed, the remaining amount of the slag being poured off during the entire period of the discharge of the remaining 50% of the metal.

The essence of the herein-proposed method is the following.

It is proposed that about one half of the entire given amount of the refinery slag be poured off in the stream of the discharged metal before the discharge of the first 20% of the metal is over.

Due to the large kinetic energy of the metal stream and also due to additional mixing of the slag and metal, because of collision of the streams, the discharge of the first 50% of the entire quantity of metal results in a sufficiently large interface and, consequently, in high refining efficiency.

During the discharge of the remaining 50% of the metal, the energy of the metal stream decreases; at this time it is proposed that the refinery slag be poured off on the metal stream.

In comparison with the known methods, the present method makes it possible to increase considerably the interface of the metal-slag phases and to make use of the high refining capacity of the slag. As a whole, due to a combined discharge of the slag and metal during the discharge of the first portion of the metal and, especially, during the discharge of the remaining 50% of the metal, the efficiency of refining increases, as compared to the known methods.

The advantages of the herein-proposed method can be seen more specifically from the following examples.

EXAMPLE 1

To refine medium-carbon steel melted in a 140-ton open-hearth furnace, 4.5 tons of fluid refinery slag were prepared.

Preparation of the slag consists in melting initial materials in an electric furnace, heating the slag to 1,650°–1,700°, and discharging the slag into a special ladle wherefrom the slag is poured off through a lip of the ladle.

When steel is being poured off from a furnace the discharge of the slag begins immediately to form a stream which strikes the stream of the discharged metal.

After roughly 10% of the entire amount of the metal, i.e., about 14 tons, is poured off, the discharge of the slag is discontinued. At this time, one half of the entire amount of the slag, that is, about 2.2–2.3 tons, is discharged. This amount of slag is large enough for developing a large interface due to the high kinetic energy of the metal stream which falls from a height of 4–5 m at the beginning of discharge and from a height of 2–3 m by the middle of the discharge.

During the discharge of from 10 to 50% of the entire amount of metal, the slag is not discharged. The discharge of the remaining part of the refinery slag (about one half of the entire amount, i.e. 2.2–2.3 tons) begins when the discharge of the remaining 50% of the metal is resumed. The slag is discharged so that the stream of the slag strikes the metal stream. The slag is poured off during the entire period of discharge of the remaining 50% of the metal.

At this time, the collision of the streams of the reacting phases also results in a sufficiently large interface, and the refining capacity of slag is used to the utmost.

As a whole, the efficiency of refining increases by 20–50%, as compared to the known methods. To achieve the same degree of refining, the consumption of slag can be reduced to 3–4 tons.

EXAMPLE 2.

For treating low-carbon high-alloy (e.g., stainless) steel melted in a 25-ton electric furnace 1.5 tons of refinery calcareous-aluminous slag were prepared.

The slag is prepared by smelting lime and alumina in an electric furnace. The slag is heated to 1,700°, and the necessary amount is discharged into a special ladle with a pouring lip.

With the appearance of the first portions of metal in a steel-teeming ladle, the discharge of refinery slag begins through the lip of the ladle in such a way that the slag stream strikes the metal stream. During the entire period of discharge, the height of fall of the metal stream is kept constant (3–4 m), by lowering the steel-teeming ladle which is positioned on hooks of a crane.

After the discharge of the first 20% of metal, the discharge of the slag is discontinued; at this time about one half of the entire amount of the slag, that is, 0.7–0.8 tons, is poured off.

After this the discharge of the slag is interrupted; the discharge of the slag is again resumed when the discharge of the remaining 50% of metal begins.

The slag is likewise discharged so that the stream of the slag strikes the metal stream. The slag is being poured off during the entire period of the discharge of the remaining 50% of the metal, at this time about one half of the entire amount of the slag, i.e., 0.7–0.8 tons, is poured off as well. In this case the efficiency of desulphuration of the metal can be raised to 70–85%, as against 50–60% with the known method. THus, to achieve the same degree of desulphuration i.e. 50–60%, about one ton of slag can be taken for refining instead of 1.5 tons.

EXAMPLE 3.

For treating steel intended for gas pipelines, which is melted in a 300-ton open-hearth furnace, nine tons of refinery slag are prepared. The slag is prepared by burning 9.5 tons of exothermic mixture in a separate ladle with a pouring lip.

With the appearance of a metal stream in a steel-teeming ladle, the discharge of refinery slag begins by means of tilting a special ladle in such a way that the slag stream strikes the metal stream. After the discharge of the first 15% by weight of the entire metal, that is, after about 20 tons of the metal are discharged, the discharge of the slag is discontinued. At this time about 4.5 tons of the slag are ladled out.

During the discharge of a subsequent 130 tons of the metal, the slag is not ladled out. At this time, the refining process proceeds due to developing an interface, as a result of the collision of the metal and slag streams. During this period the height of fall of the metal stream changes from 5–7 m to 3–4 m, i.e., the kinetic energy of the metal stream remains high.

During the discharge of the remaining 150 tons of the metal, that is, 50% by weight of the whole melt, the discharge of the slag is again resumed in a stream which strikes the metal stream.

At this stage 4.5 tons of the slag are ladled out during the entire remaining period of discharge.

Refining results in reducing the sulphur content by 50–70%. The concentration of sulphur in the finished metal is within the limits of 0.010–0.017%, as against 0.020–0.040% initially. If refining had been carried out according to the usual method, 12 tons of slag would have been required to achieve the same results, that is, the consumption of slag was reduced by a factor of 1.3 and the cost of steel refining will, correspondingly, go down.

We claim:

1. A method for refining a quantity of metal by a correlated quantity of fluid slag comprising discharging the metal to be refined as a stream into a refining vessel, discharging the slag into said vessel in a stream which strikes the metal stream, the slag being discharged in an amount equal to 50% of the total slag content before the discharge of 20% of the metal is completed, halting the discharge of slag while continuing the discharge of the metal until 50% of the metal has been discharged, and then resuming the discharge of the remaining 50% of the slag as a stream striking the metal stream during the time when the remaining 50% of the metal is discharged.

2. A method as claimed in claim 1 wherein the first 50% of the slag is discharged with 10% of the metal.

3. A method as claimed in claim 1 wherein the first 50% of the slag is discharged with 15% of the metal.

4. A method for refining a quantity of molten steel by a correlated quantity of fluid slag, said method comprising discharging the molten steel as a stream into a vessel, simultaneously discharging a stream of the fluid slag into the vessel such that the two streams strike one another, the amount of slag being such as to provide development of a large interface surface for refining purposes with mixing of the streams and removal of impurities from the steel into the slag, halting the slag discharge while continuing the discharge of the steel for a determined period, and then continuing the discharge of the remaining quantity of slag with the remaining quantity of steel.

* * * * *